Jan. 14, 1941.  F. C. GEIBIG ET AL  2,228,625

SPEED CONTROL MECHANISM

Filed Feb. 25, 1939  4 Sheets-Sheet 1

INVENTORS
FRANK C. GEIBIG
STANLEY H. ROYER

BY *[signature]*

ATTORNEY

Patented Jan. 14, 1941

2,228,625

UNITED STATES PATENT OFFICE 2,228,625

SPEED CONTROL MECHANISM

Frank C. Geibig, Westfield, and Stanley H. Royer, Elizabeth, N. J., assignors to Oxweld Acetylene Company, a corporation of West Virginia Application February 25, 1939, Serial No. 258,354

16 Claims. (Cl. 171—222)

This invention relates to an improved speed control mechanism for maintaining the velocity of a moving member at a substantially constant value.

Prior speed control devices for electric motors and the like usually employ a relatively complicated intermediate element of the centrifugal governor type between the motor shaft and the speed calibrating and control mechanism. The complicated construction of such devices and the relatively large space they require has limited their use.

This is particularly true in the case of the relatively small electric driving motors employed on oxy-gas cutting machines, which machines are now used extensively in the metal working art. It is necessary that these cutting machines traverse the line of cut at substantially a uniform speed to obtain optimum efficiency of the cutting apparatus. The problems of low cost, accurate calibration and the attainment of the necessary range of velocities in the speed control mechanisms for these motors have not as yet been solved satisfactorily.

Other attempts have been made to provide an electrical control system to maintain the motor speed at a uniform value. Such control systems, however, require an expensive and intricate arrangement of space discharge devices and relays.

While the invention is particularly adaptable to controlling the speed of an electric motor, it is equally adaptable to controlling the speed of other motors or prime movers, such as internal combustion engines, Diesel engines, steam engines and turbines, etc.

It is, therefore, among the objects of this invention to provide an improved speed control mechanism for maintaining the speed of a moving member at a substantially constant value. Other objects are to provide an improved speed control mechanism which is simple and economical in its parts; which may be calibrated accurately to select the uniform speed or angular velocity desired; which is operative over a wide range of speeds or angular velocities; which is equally effective irrespective of the direction of movement of the controlled moving member; which may be operatively associated with the controlled moving member without being mechanically connected thereto; and which is compact in form, rugged in construction and inexpensive to manufacture.

These and other objects of the invention will in part be obvious and in part become apparent from a consideration of the following description in connection with the accompanying drawings, in which.

Broadly speaking, the objects of the invention may be attained by interposing a control device between a motor and its source of power, exerting a torque upon such device proportional to the angular velocity of a rotating portion of such motor through the medium of an element arranged in mechanically independent but cooperative relation with the rotating portion of the motor, and exerting a counter torque on such device proportional to a preselected desired angular velocity of the rotating portion of the motor.

More specifically, the invention is based upon the following principle. A magnetic pole or poles are placed within a ring of magnetic material. When the magnetic pole or poles rotate, the magnetic field, produced between the pole or poles and this magnetic member, rotates with the pole or poles. In the illustrated embodiments of the invention, an electrically conductive speed responsive element or member is interposed between the pole faces and the surrounding iron or steel member. The angular velocity of the rotating field, generated by the magnetic pole or poles is substantially proportional to the angular velocity of the rotating magnetic pole or poles. This field, through the eddy or Foucault currents developed in the conductive member, exerts a torque upon this member proportional to the angular velocity of the magnetic poles. The torque thus exerted on the conductive member may be used to control the cooperative relation of a pair of contacts interposed in the control circuit of the motor or other device whose speed is to be regulated. Other means are provided for adjusting the counter torque exerted on the conductive member in proportion to the uniform speed which it is desired that the motor, or other regulated device, should attain.

Figure 1:
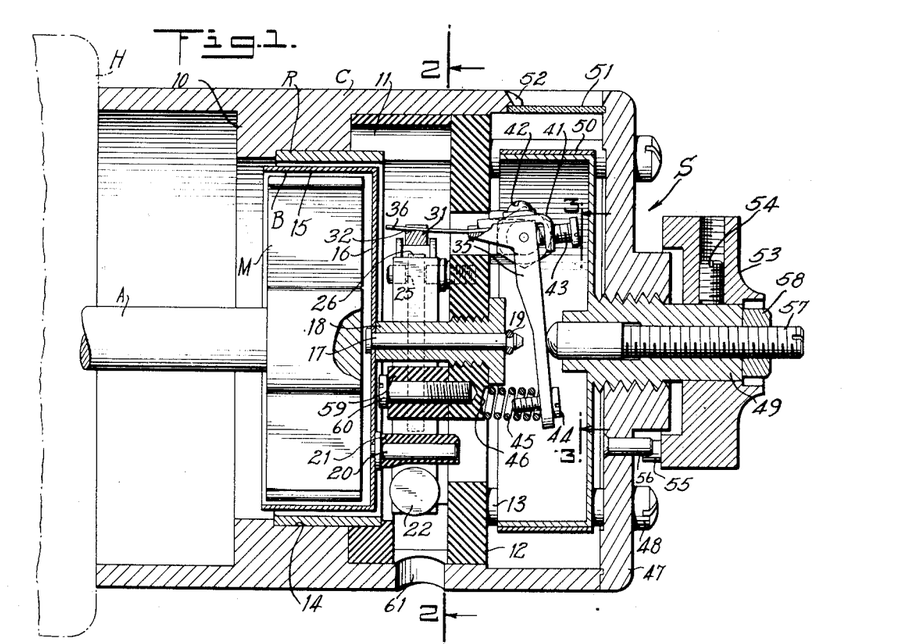
Fig. 1 is a longitudinal sectional view through one embodiment of the improved speed controlling mechanism of the invention as mounted on the end of a motor casing.
Figure 2:
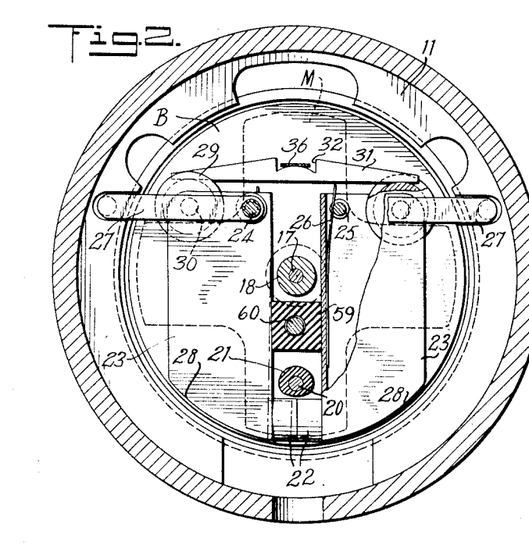
Fig. 2 is a section on the line 2—2 of Fig. 1 looking in the direction of the arrows.
Figure 3:
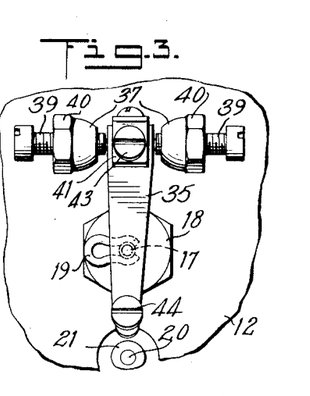
Fig. 3 is an elevational view of a portion of the apparatus shown in Fig. 1 taken approximately on the line 3—3 of Fig. 1 and looking in the direction of the arrows.

Referring to the embodiment of the invention illustrated in Figs. 1, 2, and 3, the speed control mechanism S of the invention is shown as including a casing C secured to the housing H of an electric motor, or other device, having a rotatable armature shaft A. Secured to the end of the armature shaft A are one or more permanent magnets M which are substantially radially aligned with a magnetic, preferably steel, ring R mounted in the casing C. When the shaft A carrying the rotating magnet or magnets M is rotated, the magnetic field generated between the pole faces of the magnets and the ring R rotates with the magnets M. In this embodiment of the invention, this rotating magnetic field is utilized to exert a torque upon a speed responsive element such as an electrically conductive cup B, a portion of which cup is disposed between the magnet pole faces and the steel ring R. The cup B may be formed of copper, aluminum, or some metal having a low temperature coefficient of resistivity. Such a metal may be that known as "Advance metal," which comprises approximately 60% copper and 40% nickel. The torque thus exerted upon the cup B is substantially proportional to the angular velocity of the armature shaft A. Suitable means are provided in the mechanism S for utilizing the torque exerted upon the cup B to separate a pair of contacts forming part of a speed responsive switch controlling the motor circuit when a predetermined angular velocity of the armature shaft has been attained. In case it is desired to employ the speed responsive switch or mechanism with a machine or engine other than an electric motor, such as for instance an internal combustion, Diesel, or steam engine or a turbine, the contacts may be included in an electric control circuit for the throttle or other regulating means of the machine, as shown diagrammatically in Fig. 12. The particular construction or arrangement of the parts of the mechanism S which are actuated by the cup B will now be described in more detail.

The casing C is formed with an annular rib 10 against the axially outer side of which is seated a rubber ring 11. Engaging the other side of the ring 11 is a circular plate 12 of non-conductive material, and the plate 12 and the ring 11 are held in position against the rib 10 by means of a plurality of bolts 13. The rib 10 and the rubber ring 11 cooperate to form a shallow annular recess 14 in which the ring R is firmly seated. The cup B includes a cylindrical portion 15 disposed between the magnet or magnets M and the ring R and a flat, disk-like portion 16, to which is rigidly secured, as by welding or other suitable means, a shaft 17 mounted in a bearing member 18 threaded through the plate 12. A clip 19, engaging a groove on the outer end of the shaft 17, holds the shaft and the cup against displacement with respect to the bearing member 18. By the described arrangement, the cup B is rotatably mounted on the stationary plate 12. Secured to the flat portion 16 of the cup B at a point near the outer periphery thereof is a pin 20 on which is eccentrically disposed an insulating sleeve 21 for a purpose to be described hereinafter.

The speed responsive switch includes a pair of contacts 22, each mounted on a substantially rectangular channel shaped member 23 pivoted at its upper inner corner (see Fig. 2) on a pin 24 threaded in the stationary plate 12. Each pin 24 is undercut as at 25 and a spring 26, secured to each member 23 and engaging this undercut portion, retains the members against displacement longitudinally of the pin and also establishes better electrical contact. Flexible connectors 27 are secured to each of the pins 24 and each connector engages a current carrying conductor extending through the casing C. In practice, one of the current carrying leads for the motor is severed and the severed ends are each secured to one of the connectors 27. Each member 23 is curved at its bottom edge 28 about the same center as the rubber ring 11 but on a shorter radius, so that clearance is left between the ring and the lower edges of the members 23. Between the flat surfaces of each member 23, and at the upper outer corner of each of these members, a flanged roller 29, of insulating material, is mounted on a pin 30. A pressure bar 31 formed with a central recess 32 extends between and engages the upper surfaces of each of the flanged rollers for a purpose to be described hereinafter.

The means for exerting a counter torque on the cup B, through the members 23 and the pin 20, includes a bell crank 35 pivotally mounted on the opposite side of the plate 12 from the members 23, and to one arm of this bell crank is secured a leaf spring 36, the end of which engages the recess 32 in the bar 31. Referring particularly to Fig. 3, the pivotal mounting for the bell crank 35 comprises a pair of brackets 37 secured to the plate 12 in each of which is threaded an adjusting screw 39 engaging one side of the bell crank 35 and provided with a locking nut 40. By the described means, the bell crank 35 may be adjusted so that the spring 36 engages the bar 31 at substantially the center thereof so that equal spring pressure can be applied to each member 23 through roller 29 so that speed can be equalized in each direction. The shorter arm of the bell crank 35, which arm is engaged by spring 36, is recessed to form a groove receiving the spring, as best shown in Fig. 1. The longitudinally slotted longer arm of an L-shaped bracket 41 is maintained in this groove in overlying engagement with the spring 36 by means of a screw 42. The other arm of the L-shaped bracket carries an adjusting screw 43 engaging the longer arm of the bell crank, and, by means of the screw 43, the bracket 41 may be moved longitudinally of the shorter arm of the bell crank 35, thereby varying the effective springing length of the spring 36. This correspondingly varies the effective pressure exerted by the spring 36 upon the bar 31. The screw 42 is used to clamp the bracket in its adjusted position. The lower end of the longer arm of the bell crank 35 carries a spring guiding screw 44 engaging a spring 45, which, at its opposite end, is seated in a shallow recess 46 in the outer surface of the stationary plate 12.

A cover plate 47 is secured to the casing C by screws 48. Threadedly mounted through the center of the cover plate is a sleeve or trunnion 49, and on the inner end of the sleeve or trunnion is formed a cup shaped dial 50 on which may be impressed characters or other indicia designating various linear speeds or angular velocities. These indicia may be observed through a window 51 formed in the casing C, and adjacent which is a reference line or element 52 cooperating with the dial 50. The dial may be rotatably adjusted by means of a knob 53 secured on the outer end of the sleeve 49 by means of a set screw 54, and which is provided with a stop 55 adapted to engage a similar stop 56 on the plate 47 to limit movement of the knob and dial in either direction. The distance between the inner end of sleeve 49 and bell crank 35 may be adjusted by means of a screw 57 threaded through the sleeve 49 and engaging the longer arm of the bell crank, and a locking nut 58 on the outer end of screw 57 serves to lock the screw in its adjusted position.

In operation, as the shaft A carrying the magnet or magnets M thereon is rotated, the magnetic field generated between the pole faces of the magnets and the steel ring R rotates at an angular velocity substantially proportional to that of shaft A. This field exerts a torque upon the cup B proportional to the angular velocity of the shaft A. Movement of the cup B will cause the insulated pin 20 thereon to engage one of the members 23 and tend to move this member away from the other member, thereby separating the contacts 22. An insulating block 59 mounted upon a pin 60 secured to the plate 12 is provided between the members 23 to prevent one member from following the other when the latter is moved by the pin 20.

A counter torque, proportional to the desired constant angular velocity and maintaining the contacts 22 in engagement in opposition to the pressure exerted by pin 20 thereupon tending to separate the contacts, is obtained by the adjustable speed selecting means previously described. This counter torque may be adjusted initially in correspondence with any particular angular velocity of the shaft A by altering the effective length of the spring 36 between the bar 31 and the inner end of bracket 41 through the medium of the screw 43, and/or by loosening the locking nut 58 and turning the adjusting screw 57 to vary the distance between sleeve 49 and bell crank 35. When the mechanism has been accurately calibrated, the knob 53 is turned until the desired linear speed or angular velocity as marked on the dial 50 appears in the window 51 opposite the reference line or element 52. When the shaft A attains the indicated angular velocity, or an angular velocity corresponding to a given indicated linear speed of the machine operated by the motor, the torque exerted upon the cup B, by the rotating magnetic field previously described, will cause the insulated pin 20 on the cup to engage one of the members 23 and separate the contacts 22, thus opening the control or power circuit for the motor.

It will be noted that the speed controlling mechanism is operative regardless of the direction of rotation. Furthermore, suitable openings 61 are provided at various points in the casing C to insure adequate ventilation of the parts of the mechanism particularly adjacent the current carrying contacts 22, thereby adequately dissipating any heat generated therein. The entire mechanism is compact and simple in arrangement, comprises few parts, is relatively easily calibrated, is accurate in operation and is operative over a wide range.

The embodiment of the invention illustrated in Figs. 4 to 8, inclusive, is essentially similar to that described above and like reference characters, primed, have been used to designate corresponding parts. In this form of the invention, the motor housing H' is formed with an extension E partially disposed within a casing C' secured to the housing, and the ring R' is formed integral with the extension E. The speed control mechanism S' is mounted partially on the extension E and partially on the casing C', and includes a cup B' cooperatively associated with the magnet or magnets M', on the end of shaft A', and the ring R'.

Figure 4:
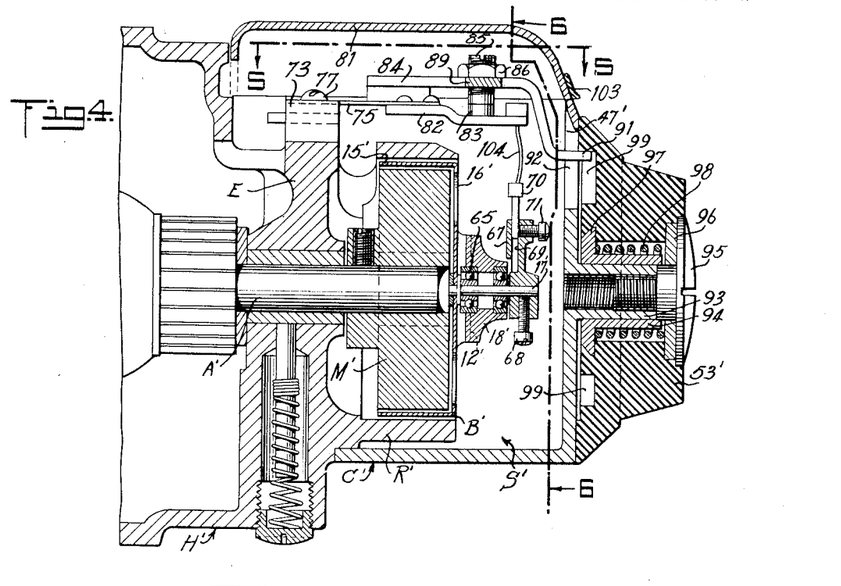
Fig. 4 is a view similar to Fig. 1 illustrating another embodiment of the invention.

A plate 12' extends across the open end of the extension E and is formed with a bearing member 18' provided with suitable ball bearings 65 for the pivot or shaft 17'. Secured on the inner end of shaft 17' is the cup B', and to secure lightness in construction, the flat portion 16' of the cup may be formed with a series of apertures 66. An arm 67, secured on the outer end of the shaft 17' by means of a set screw 68, is provided with a socket 69 receiving a pin 70 adjustably held therein by a set screw 71. Normally, the arm 67 and pin 70 extend substantially in a vertically upward direction.

Figure 5:
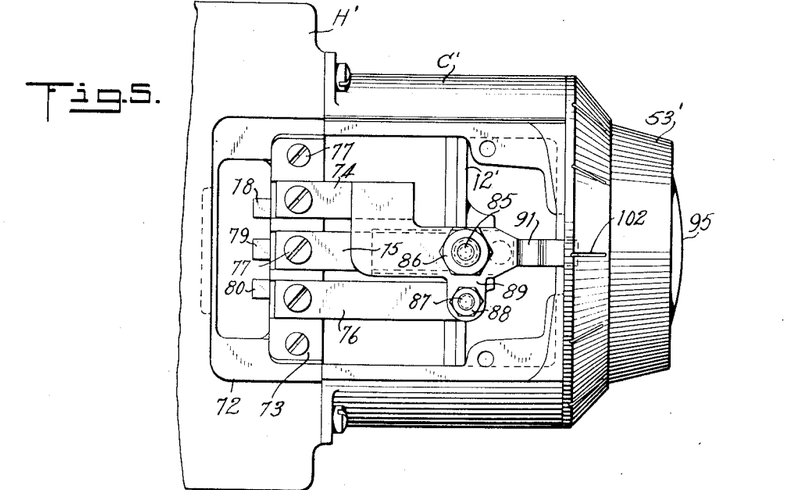
Fig. 5 is a plan view of a portion of the apparatus shown in Fig. 4 taken approximately on the line 5—5 of Fig. 4.
Figure 6:
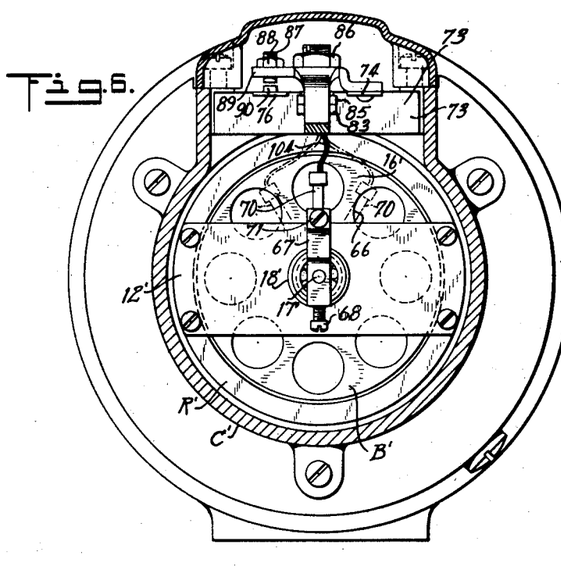
Fig. 6 is a section on the line 6—6 of Fig. 4 looking in the direction of the arrows.

Mounted on the motor housing extension E, adjacent an opening 72 in the casing C', is a block 73 of insulating material, which supports three electrically conductive leaf springs 74, 75, and 76. The screws 77, securing the leaf springs 74, 75, and 76 to the block 73, connect each spring to one of three terminals 78, 79, and 80, respectively, forming part of a control circuit for the motor. A cover plate 81 is adapted to be secured to the casing C' and the housing H' to close the opening 72.

On the central spring 75 is mounted a downwardly offset arm 82 on the end of which is a switch contact 83, and a flexible cable or link 104 is secured to the arm 82 and the pin 70. On one outer spring 74 is mounted a laterally and upwardly offset arm 84, in which is adjustably secured a switch contact 85 cooperatively associated with the switch contact 83 and adapted to be locked in adjusted position by a lock nut 86. An adjustable stud bolt or contact 87, provided with a lock nut 88, is mounted in an offset ear 89 on the arm 84, and bolt 87 may or may not engage a contact 90 on the other outer spring 76. For a purpose to be described hereinafter, arm 84 is formed with a downwardly offset extension or finger 91 extending through a slot 92 in the end plate 47' of the casing C'.

Figure 7:
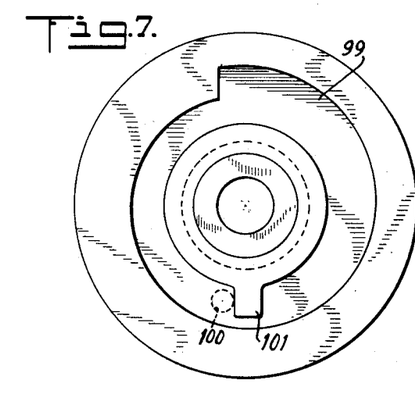
Fig. 7 is an elevational view of an element forming part of the embodiment of the invention illustrated in Figs. 4, 5, and 6.

The end plate 47' is formed with a central, internally threaded hub 93, surrounded by a sleeve 94 secured in a knurled knob 53' formed of suitable insulating material. A large-headed screw 95 threaded into the hub 93 cooperates with a washer 96 to maintain the knob 53' and sleeve 94 in position on the hub 93. Engaging a flange 97 on the inner end of sleeve 94 and the washer 96, is a spring 98 which urges the knob and the sleeve toward an axially inward position. The inner face of knob 53' is formed with a spiral cam groove 99 in which is cooperatively engaged the finger 91 of the arm 84 on spring 74. As best shown in Fig. 7, suitable stops 100 and 101 may be formed on the end plate 47' and the knob 53', respectively, to limit rotation of the knob. Suitable speed indicia 102, cooperating with a reference line 103 on the cover plate 81, may be placed on the knob 53'. These indicia may represent revolutions per minute, feet per minute, or any other information desired in terms of uniform velocity.

Figure 8:
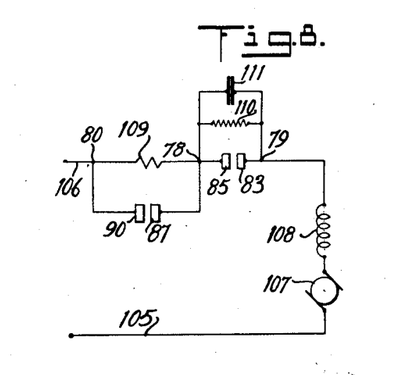
Fig. 8 is a wiring diagram of a control circuit with which the embodiments illustrated in Figs. 4 to 7, inclusive, and Figs. 9 and 10 may be operatively associated to control the speed of an electric motor.

This embodiment of the invention will be explained in connection with the circuit shown in Fig. 8, in which the current conductors for the motor are indicated at 105 and 106, the motor armature at 107 and the series motor field winding at 108. One conductor 105 is connected directly to the motor armature. The other conductor 106 is connected directly to terminal 80, operatively associated with the leaf spring 76 and contact 90. The other side of the field winding is connected to terminal 79, operatively associated with leaf spring 75, arm 82, and contact 83. Connected across terminals 78 and 80, and thus in series with the circuit controlling contacts 83 and 85, is a relatively small resistor 109. As will be described more fully hereinafter, this resistor limits the voltage applied to the motor when the angular velocity of the motor is below a predetermined value. When this predetermined value is exceeded, the resistor 109 may be shunted by contacts 87 and 90, in a manner to be described. To reduce arcing across contacts 83 and 85, when separated under load, and to increase the useful life and performance characteristics of these contacts, a suitable resistor 110 and a suitable condenser 111 are connected to terminals 78 and 79 in parallel with contacts 83 and 85.

The operation of this embodiment of the invention is similar to that previously described. The cup B' exerts a torque on the cable or link 104 proportional to the angular velocity of shaft A'. This cable or link is sufficiently long to permit the pin 70 to be moved to either of the positions shown in dotted lines in Fig. 6. The torque thus exerted tends to pull the arm 82 downwardly and separate the contact 83 from the contact 85 and break the power or control circuit for the motor.

The desired angular velocity of the shaft A' at which this separation of the contacts takes place may be selected by rotating the knob 53'. As the finger 91 of the arm 84 is in contact with the spiral groove 99 in the inner face of knob 53', the arm 84 and hence the contact 85 will be forced downwardly a definite amount according to the position of the knob 53'. When the angular velocity of shaft A' reaches this preselected value, the torque exerted on cup B' will be sufficient to cause the pin 70 and the cable or link 104 to pull the arm 82 downwardly an amount sufficient to separate contacts 83 and 85, and thus hold open the control circuit until such time as the angular velocity of shaft A' drops below this preselected value.

The resistor 109, when in circuit, reduces the voltage applied to the motor and thus the torque of the motor. This is desirable to insure smoother operation throughout approximately the lower third of the speed range of the motor, and to improve contact operation on direct current in this speed range. However, to obtain the highest speed of the motor, it is necessary that the resistor 109 be cut out of the circuit throughout the remainder of the speed range. By referring to Fig. 8, it will be apparent that the resistor 109 may be shunted by the contacts 87 and 90. As the contact 87 is mounted on the arm 84, which is controlled by the knob 53', it will be apparent that this contact will be moved into engagement with contact 90 when the knob 53' has been turned to indicate a desired preselected speed. For all speeds above this desired speed, the resistor 109 will be shunted by the contacts 87 and 90.

To calibrate the indicia 102 and 103 with the actual angular velocity of the shaft A' or the linear speed of the device actuated by the motor, various means are provided. By loosening the set screw 71, the pin 70 may be adjusted in the socket 69 of arm 67 to vary the effective torque exerted on the cable or link 104. In addition, the contact 85 may be adjusted vertically on arm 84 and with respect to contact 83 by loosening lock nut 86. These several adjustments permit the indicated linear speed or angular velocity to be accurately calibrated with the actual linear speed or angular velocity.

Another adjustment is provided so that the angular velocity of shaft A' at which the resistor 109 is shunted by contacts 87 and 90 may be preselected accurately. To accomplish this adjustment, lock nut 88 may be loosened and threaded stud or contact 87 adjusted vertically of the offset ear 89 of arm 84, so that a definite distance separates contacts 87 and 90.

Arcing across the contacts 83 and 85 when these contacts are separated under load is reduced by resistors 109 and 110 and condenser 111, as previously described. The resistor 109 connected across the contacts 87 and 90 improves the operation of the governor at low speeds. In the circuit disclosed in Fig. 8, some current will flow through resistors 109 and 110 and condenser 111 when contacts 83 and 85 are separated. However, the value of these impedances is so selected that this current will be insufficient to energize the motor to the point of actually running.

When the above described calibrating adjustments have been made, they are not disturbed during further operation of the speed controlling mechanism except for replacing burned contacts. It should be noted that replacement of contacts can be made without changing the spring forces, so that the motor need not be recalibrated after such replacement of contacts.

When the speed controlling mechanism of the invention is in operation, its temperature rises. As the temperature of the cup B' increases, its resistance increases, and hence the eddy or Foucault currents induced in the cup are decreased. Because of the decrease in the induced currents, the torque exerted on the cup is decreased, and the angular velocity of the shaft A' will exceed the preselected value before the torque exerted on and through the cup B' is sufficient to separate the contacts 83 and 85. To overcome this objectionable feature, the contact arrangement shown in Figs. 9 and 10 may be used. It should be understood that an equivalent arrangement can be used with the embodiment of the invention illustrated in Figs. 1, 2, and 3.

Figure 9:
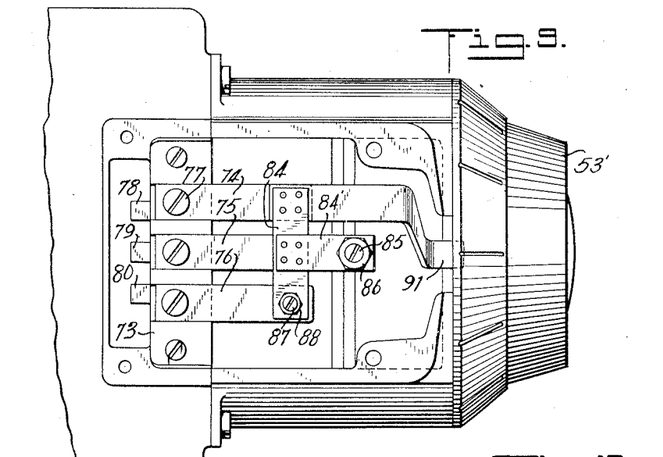
Fig. 9 is a view similar to Fig. 5 illustrating a modification of the embodiment of the invention shown in Figs. 4 to 7, inclusive.
Figures 10, 11:
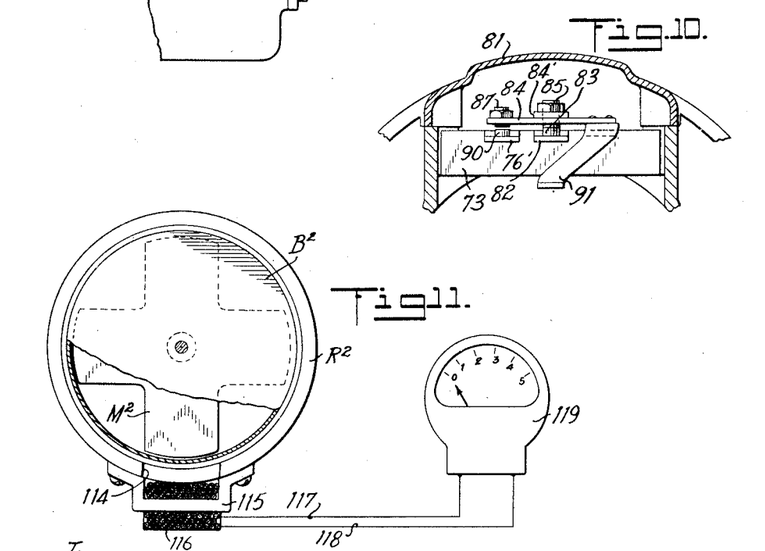
Fig. 10 is an end elevational view of a portion of the apparatus shown in Fig. 9.
Fig. 11 illustrates an arrangement for visually indicating the speed of the moving member controlled by either modification of the invention.

In this embodiment, the leaf spring 74 extends forward a greater extent, and the finger 91, cooperating with groove 99 in knob 53' is formed on this leaf spring. Arm 84 is formed as a separate member, secured at one end to leaf spring 74 and carrying in its opposite end contact 87 cooperating with contact 90 on leaf spring 76. At the center of arm 84 is secured a temperature responsive means such as a forwardly extending, bimetallic arm 84', carrying, at its free end, the contact 85 cooperating with contact 83. Bimetallic arm 84' is so designed that, as the temperature increases, it will bow upwardly, decreasing the torque necessary to separate contacts 85 and 83 and compensating for the reduced torque exerted through cup B' on contact 83. Similarly, when the temperature decreases, arm 84' will bow downwardly, increasing the torque necessary to separate contacts 83 and 85 and compensating for the reduced torque exerted on cup B'.

If it is desired to have a visual indication of the speed of the controlled member, the arrangement illustrated in Fig. 11 may be used. In this arrangement the ring R² may be broken away at a point 114 in its circumference and a U-shaped bracket 115 may be secured thereto. A coil 116 is wound on this bracket and the two terminals of the coil are connected by conductors 117 and 118 to a suitable indicating meter 119.

Rotation of the magnet or magnets M² within the cup B² and the ring R² will induce an electric current in coil 116 proportional to the speed of rotation of the magnet or magnets. This current will be indicated by meter 119 which may be calibrated in revolutions per minute, feet per minute, or any other indications desired, dependent upon the service to which the speed regulating mechanism is to be put.

Figure 12:
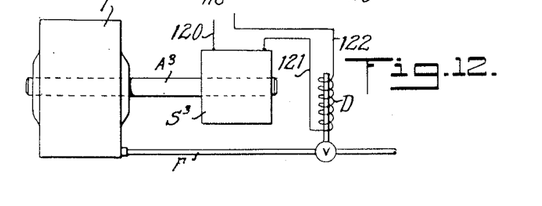
Fig. 12 diagrammatically illustrates the application of the invention to control the speed of a machine other than an electric motor, such as heat engines, turbines, etc.

Fig. 12 digrammatically illustrates the application of the invention to the control of the speed of machines other than electric motors, such as heat engines and turbines. In this figure, T designates any suitable heat engine or turbine having a power driven shaft A³. The heat engine or turbine T is supplied with motive fluid, such as steam, gas, etc., through a supply line F, and the supply of fluid is controlled by a suitable throttle valve V which is normally closed but which may be opened by the solenoid D when energized. Energization of the solenoid D is controlled by the speed control mechanism S³, operatively associated with the shaft A³. The mechanism S³ may be either of the control mechanisms previously described.

One contact of mechanism S³ is connected to a suitable source of electric current through a conductor 120. The other contact is connected by conductor 121 to one terminal of solenoid D. The opposite terminal of solenoid D is connected to the source of electric current by conductor 122.

When the speed of the heat engine or turbine T is below the value preselected on the speed control mechanism S³, the contacts of the mechanism S³ corresponding to contacts 22 of mechanism S, or 83, 85 of mechanism S' are in engagement, and the actuating solenoid or relay D is energized, holding the throttle valve V open and permitting motive fluid to pass through the supply line F. When the speed of the engine or turbine exceeds the preselected value, the contacts of mechanism S³ are separated in either of the manners previously described. As the solenoid D is thus deenergized, valve V will close, interrupting the motive power (i. e. the fuel or steam supply) for the engine or turbine T until such time as the speed of the latter falls below the preselected value.

In one test conducted with the described speed control apparatus, the maximum speed obtained was ninety-six times as great as the minimum speed. From this, it will be readily apparent that the speed control mechanism is operative over a wide range of speed and its usefulness is thereby enhanced.

While, for the purpose of illustration, particular embodiments of the invention have been described in detail, it will be obvious to those skilled in the art that the invention may be otherwise embodied and the dimensions and interrelations of parts altered without departing from the principles of the invention.

What is claimed is:

1. A speed governing and selecting system comprising, in combination, a control device adapted to be interposed between a power driven rotor and its source of power, said device comprising normally abutting contact members; an element operatively associated with said device and adapted at times to separate said members to interrupt the power supply of said rotor; rotatable means driven by said rotor and magnetically actuating said element, said means being adapted to exert on said element a torque, proportional to the angular velocity of said rotor, to separate said members; speed governing mechanism, operatively associated with said device, for exerting on said members a counter torque, proportional to a preselected angular velocity of said rotor, to restrain separation of said members; means operatively associated with said mechanism for selecting and indicating said preselected angular velocity; and means for initially calibrating said last-named means to accurately indicate the angular velocity of said rotor.

2. A speed responsive switch adapted to control a power driven rotor, said switch including, in combination, a pair of normally abutting, gravity influenced pivotally mounted contact members; a speed responsive element adapted to exert on said members a torque, proportional to the angular velocity of such rotor, to separate said members to control such rotor; and mechanism for exerting on said members a counter torque, proportional to a preselected angular velocity of such rotor, to restrain separation of said members; said mechanism including an equalizing bar contacting said members and resilient means operatively engaging said bar to restrain separation of said members.

3. A speed responsive switch adapted to be interposed between a power driven rotor and its source of power, said switch including in combination, a casing, a partition in said casing, and a pair of normally abutting, gravity influenced contact members pivotally mounted on said partition; a speed responsive element adapted to exert on said members a torque, proportional to the angular velocity of such rotor, to separate said members to interrupt the power supply of such rotor; and mechanism for exerting on said members a counter torque, proportional to a preselected angular velocity of such rotor, to restrain separation of said members; said mechanism including an equalizing bar contacting said members and resilient means operatively engaging said bar to restrain separation of said members.

4. A speed responsive switch as claimed in claim 3, in which said resilient means comprises a crank pivotally mounted on said partition, spring means secured to one arm of said crank and extending through an aperture in said partition into engagement with said bar, and means urging the other arm of said crank outwardly from said partition.

5. A speed responsive switch as claimed in claim 3, in which said resilient means comprises a crank pivotally mounted on said partition, spring means secured to one arm of said crank and extending through an aperture in said partition into engagement with said bar, means urging the other arm of said crank outwardly from said partition, and means for adjusting said crank laterally of said partition to center said spring means on said bar.

6. A speed responsive switch as claimed in claim 3, in which said resilient means comprises a crank pivotally mounted on said partition, spring means secured to one arm of said crank and extending through an aperture in said partition into engagement with said bar, means urging the other arm of said crank outwardly from said partition, and means adjustably securing said spring means to said crank whereby the effective length of said spring means may be varied to vary the pressure exerted by said spring means on said bar.

7. A speed responsive switch as claimed in claim 3, in which said resilient means comprises a crank pivotally mounted on said partition, spring means secured to one arm of said crank and extending through an aperture in said partition into engagement with said bar, means urging the other arm of said crank outwardly from said partition, and adjustable means engaging said other arm of said crank and limiting the outward movement thereof.

8. A speed responsive switch comprising in combination, a rotatable shaft; a casing enclosing one end of said shaft; magnet means mounted on the end of said shaft; a cup shaped electrically conductive member rotatably mounted in said casing in coaxial spaced relation to said shaft and operatively associated with said magnet means; a plurality of spaced parallel contact carrying spring means mounted in said casing, one of said spring means having an upwardly and laterally offset portion, carrying contacts aligned with the contacts on the others of said spring means; a flexible connection operatively secured to one of said spring means and said cup shaped member; and a speed selecting member rotatably mounted on said casing and operatively engaging said spring means having said offset portion.

9. A speed responsive switch as claimed in claim 8, in which one of the contacts carried by said offset portion is normally in engagement with the contact on the spring means operatively associated with said cup shaped member; and the other contact carried by said offset portion is normally separated from the contact carried by the third of said spring means but is adapted to be moved into engagement therewith by rotation of said speed selecting member to indicate a preselected speed range.

10. A motor control system comprising, in combination, an electric motor having a housing; a casing adapted to be secured to said housing; first and second sets of circuit controlling contacts; a resistor adapted at times to be shunted by said second set of contacts; an element pivotally mounted on said housing; a connection between said element and one contact of said first set of contacts; rotatable means driven by said motor and magnetically actuating said element, said means being adapted to exert on said element a torque, proportional to the angular velocity of said motor, to separate said one contact from its cooperating contact; mechanism mounted on said casing for retaining said first set of contacts in engagement until the angular velocity of said motor exceeds a preselected value; and manually adjustable means operatively associated with said second set of contacts for causing engagement thereof to shunt said resistor when said preselected angular velocity is between certain values.

11. A control system comprising, in combination, resiliently mounted, normally engaging contacts; a pivotally mounted element; a connection between said element and one of said contacts; rotatable means for magnetically actuating said element, said means being adapted to exert on said element a torque, proportional to the angular velocity of said means, to separate said contacts; mechanism operatively associated with said contacts for exerting thereon a torque, proportional to a preselected angular velocity, to restrain separation of said contacts, said mechanism including a temperature responsive support for one of said contacts, said support, upon an increase in the temperature of said element, being adapted to urge said contacts to separate thereby to decrease the torque necessary to separate said contacts.

12. A motor control system comprising, in combination, an electric motor having a housing; a casing adapted to be associated with said housing; resiliently mounted, normally engaging contacts mounted in said casing; an element pivotally mounted on said housing; a connection between said element and one of said contacts; rotatable means driven by said motor and magnetically actuating said element, said means being adapted to exert on said element a torque, proportional to the angular velocity of said motor, to separate said contacts; mechanism operatively associated with said contacts for exerting thereon a torque, proportional to a preselected angular velocity of said motor, to restrain separation of said contacts, said mechanism including a temperature responsive support for one of said contacts, said support, upon an increase in the temperature of said element, being adapted to urge said contacts to separate thereby to decrease the torque necessary to separate said contacts.

13. A speed responsive switch adapted to be interposed between a power driven rotor and its source of power, said switch comprising, in combination, resiliently mounted, normally engaging contacts; a speed responsive element operatively associated with one of said contacts to exert on said contact a torque, proportional to the angular velocity of such rotor, to separate said contacts to interrupt the power supply of such rotor; and mechanism, operatively associated with the other of said contacts, for exerting thereon a torque, proportional to a preselected angular velocity of such rotor, to urge said contacts into engagement, said mechanism including a bimetallic support for one of said contacts, said support upon an increase in temperature of said element being adapted to urge said contacts to separate thereby to decrease the torque necessary to separate said contacts.

14. A speed selecting and indicating system comprising, in combination, a control device adapted to be interposed between a power driven rotor and its source of power, said device comprising normally abutting contact members; an element operatively associated with said device and adapted at times to separate said members to interrupt the power supply of said rotor; rotatable means driven by said rotor and magnetically actuating said element, said means being adapted to exert on said element a torque, proportional to the angular velocity of said rotor, to separate said members; speed selecting mechanism, operatively associated with said device, for exerting on said members a counter torque, proportional to a preselected angular velocity of said rotor, to restrain separation of said members; and means inductively associated with said first-named means for indicating the angular velocity of said rotor.

15. A speed indicator comprising, in combination, a rotatable shaft; magnet means mounted on said shaft; a stationary ring of magnetic material associated in spaced relation with said magnet means; and means inductively associated with said ring for indicating the angular velocity of said shaft.

16. A combined speed selecting and indicating system comprising, in combination, a rotatable shaft; magnet means mounted on said shaft; a stationary ring of magnetic material associated in spaced relation with said magnet means; circuit controlling contacts; a speed responsive element magnetically actuated by the rotation of said magnet means and operatively associated with said contacts to urge said contacts to separate; adjustable speed selecting means restraining separation of said contacts; and indicating means inductively associated with said ring for indicating the angular velocity of said shaft.

FRANK C. GEIBIG.
STANLEY H. ROYER.